April 7, 1936.                H. E. KEYES                2,036,578
          METHOD OF AND APPARATUS FOR TREATING ORES AND SIMILAR MATERIALS
                    Filed July 1, 1932           2 Sheets-Sheet 1
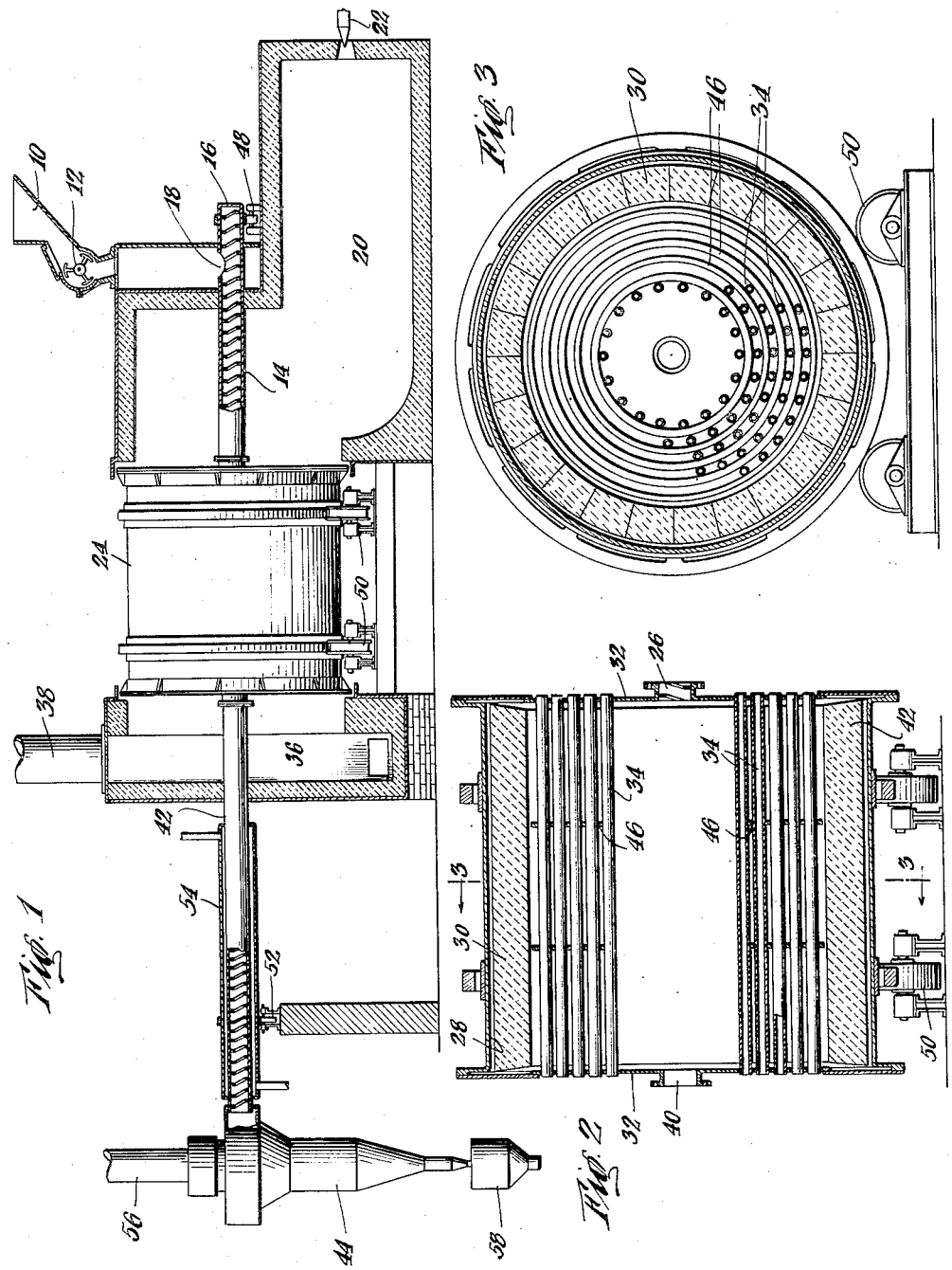
INVENTOR
*Harmon E. Keyes*
BY
*Hoguet & Neary*
ATTORNEYS April 7, 1936. H. E. KEYES 2,036,578
METHOD OF AND APPARATUS FOR TREATING ORES AND SIMILAR MATERIALS
Filed July 1, 1932 2 Sheets-Sheet 2
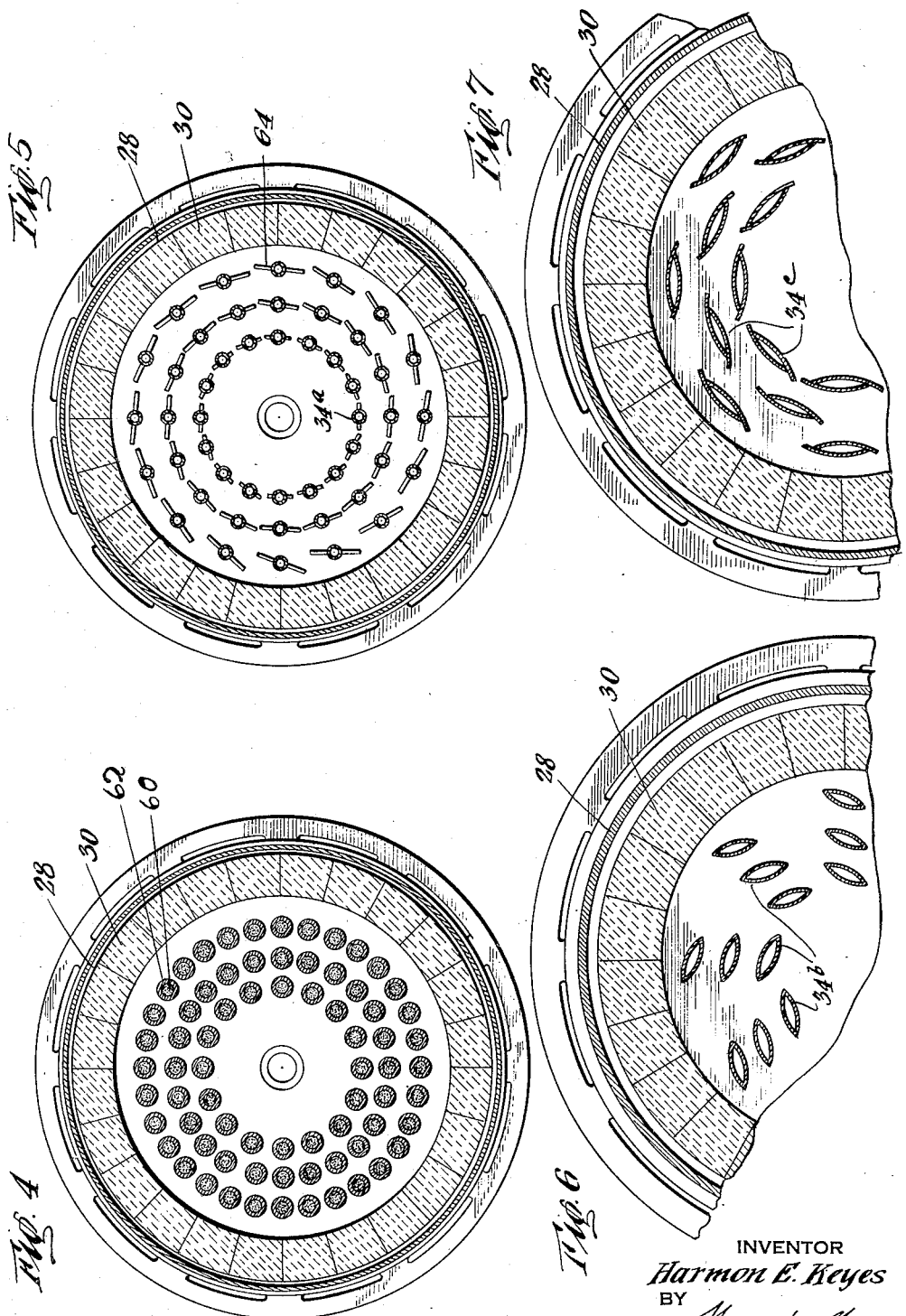
INVENTOR
*Harmon E. Keyes*
BY
*Hoguet & Neary*
ATTORNEYS Patented Apr. 7, 1936

2,036,578

UNITED STATES PATENT OFFICE 2,036,578

METHOD OF AND APPARATUS FOR TREATING ORES AND SIMILAR MATERIALS

Harmon E. Keyes, Miami, Ariz.

Application July 1, 1932, Serial No. 620,445

4 Claims. (Cl. 263—32)

My invention relates to a method of heating and to an apparatus adapted for use in practicing such method. More particularly, my invention relates to the treatment of finely-divided solid materials of low heat conductivity which require a relatively high temperature and rate of heat transfer for promoting desired physical or chemical changes, for example, to promote chemical reaction of such a material with solid or liquid material admixed therewith or with a gaseous agent brought into contact therewith.

The invention is particularly applicable in effecting reduction or other chemical change of finely-divided solid materials having the physical characteristics above mentioned without fusion or sintering and with the direct production of a finely-divided solid reduction or other chemical reaction product. As an example of such an application of the invention, I shall refer to the reduction of iron ores for the production of sponge iron.

An analysis of the requisite conditions for producing sponge iron will illustrate the advantages of my invention. The charge of iron ore is converted in a highly reducing atmosphere to metallic iron below the fusion temperature so that the particles of reduced iron remain mechanically separable. While reduction will begin to take place at relatively low temperatures, say, around about 200° C. in the presence of carbon monoxide and around about 400° C. in the presence of solid carbon, it is desirable from the standpoint of utilizing the maximum capacity of the apparatus employed to operate at as high a temperature as possible short of fusion, slagging or sintering of the reduced metal product. Although these essential factors covering the metallurgy of sponge iron manufacture have been largely understood and no obstacle has been found in reducing small charges of iron oxide to sponge iron, yet a satisfactory method of introducing heat economically in large scale operations has not been developed. This difficulty is enhanced by the low thermal conductivity of the charge, the large quantity of heat required, due to the fact that the reactions involved are predominantly endothermic, and the tendency of sponge iron to sinter and adhere to surfaces if overheated. Because of the poor heat conductivity of the charge the temperature gradient within the charge is generally high, resulting in a tendency to insufficient heating of the interior of the charge, while the portion adjacent to the source of heat is in danger of fusion. Various attempts to obviate these difficulties by special mechanical means involving indirect heating or by firing directly onto the charge as in a revolving kiln have led to undesirable complications, especially if the work is conducted on a large scale and a high operating capacity attempted.

The facts that none of the so-called sponge iron processes have proven commercially successful and that sponge iron has not been satisfactorily produced in apparatus of other types warrant the conclusion that to successfully produce sponge iron the problems of heat transfer and adhesion must be solved. The present invention has as an aim the solution of these problems in sponge iron manufacture as well as the solution of the similar problems that arise in carrying out other chemical and heat transfer processes wherein the treatment of finely-divided materials having a low heat conductivity is involved.

According to the present invention, the ore or other charge material is uniformly heated by contact with the surfaces of a plurality of heated elements under conditions whereby a high ratio of heating surface to volume of charge is maintained and, through the intermediary of means for producing relative movement between the charge and the heated elements, the constituent particles are repeatedly brought into intimate contact with the heating surfaces under conditions favorable to a high rate of absorption by such particles of the heat given off from the heating surfaces. Advantageously, the heated elements are so associated with the treating chamber as to contact with the interior of the charge and are given rapid movement within and relative to the charge, thus producing a homogeneous heating condition throughout the charge. This general method of transmitting heat to a charge of finely-divided material by direct contact together with rapid motion of the heated elements relative to the charge may be referred to as "forced convection heating of solids." The rapid movement of the heated elements through the charge serves not only to insure more rapid and uniform heating of the charge but also furnishes abrasive action tending to prevent accretions of the material undergoing treatment from adhering to the heated elements.

The forced convection heating of a charge of finely-divided solids may be brought about, for example, by employing a rotary kiln type of furnace provided with charging and discharging openings adjacent the axis and equipped with a plurality of heated elements which rotate with the furnace. As the furnace revolves the heated elements pass through the charge and cause rapid stirring, lifting and showering of the material.

For a more detailed description of the invention, reference will be made to the accompanying drawings, wherein:

Fig. 1 is a vertical side elevation of a furnace assembly, partly in section, showing an advantageous form of apparatus for carrying out my invention;

Fig. 2 is a vertical longitudinal section of the ore-treating drum taken through its axis;

Fig. 3 is a section of the drum taken on line 3—3 of Fig. 2;

Fig. 4 is a section similar to that shown in Fig. 3 of a drum of the same general form as shown in Figs. 1, 2 and 3, except that it is provided with electrically heated elements as heating means;

Figs. 5, 6 and 7 are sections generally similar to Fig. 3, but showing modifications in the shape of the heating tubes.

Referring to Figs. 1, 2 and 3 the application of the invention in producing sponge iron may be described as follows:

A mixture of dry finely-divided ore and carbonaceous reducing agent is added to the hopper 10, and fed through the gas tight feeder 12 into the screw feeder tube 14, which is closed at its outer end 16 and contains an aperture 18 for receiving feed. The feeder tube 14 extends across the fire box 20, provided at one end with a burner or burners 22, and is joined to and discharges into the ore-treating drum 24 through an axially-disposed opening 26 at one end thereof. The ore-carbon mixture is preheated in its passage through the feeder tube without coming in contact with the combustion gases.

The drum 24 takes the general shape of the Bruckner cylinder type of kiln, being of relatively great diameter as compared to its length and having inlet and discharge openings disposed near the longitudinal axis, thereby insuring that in operation the drum will be approximately half filled with charge.

The drum 24 is constructed of a steel shell 28 lined with a suitable refractory 30 and is closed at the ends by metal header plates 32. The header plates 32 support a plurality of rows of tubes 34 which connect at one end with the fire box 20 and at the opposite end with the smoke box 36 and the flue 38. Joined to the drum 24 adjacent the discharge opening 40 is a screw feeder 42 which discharges at its opposite end into the dust collector 44. The tubes 34, the header plates 32 and the screw feeder tubes 14 and 42 are constructed of steel adapted to withstand the temperatures necessary for reduction of the ore without damage. Steel rings 46 may be interposed between adjacent rows of tubes 34 to assist in holding them in place and prevent them from sagging.

The screw feeder tube 14, the drum 24 and the screw feeder tube 42 rotate as one unit on the rollers 48, 50 and 52 and are suitably driven from transmission applied at the outside of the drum 24.

The ore-carbon mixture is delivered by the feeder tube 14 to the drum 24. Due to the rotation of the drum 24 and the presence of the tubes 34 the charge is rapidly stirred and heated by repeated contacts with the hot surfaces of the tubes 34 through which the hot combustion gases from the fire box 20 are passed. The combustion gases pass through the tubes 34 into the smoke box 36 and thence through the flue 38. These hot waste gases may be suitably utilized.

By suitably controlling the temperature of the combustion gases led to the tubes 34, the charge in the drum is reduced to metal without fusion and without adherence to the contacting surfaces in a reducing atmosphere and without contact with the combustion gases from the fire box 20. The metal is discharged through the screw feeder 42, cooled by the water jacket 54 and discharged into the dust collector 44 wherein the metal is separated from the gases formed during the reduction of the ore to metal in the drum 24. The gases consist mainly of carbon monoxide. They exit from the dust collector 44 through the offtake pipe 56 and may be utilized for fuel in the burner 22. The metal from the dust collector 44 passes into the hopper 58 from which it may be withdrawn for use directly or for treatment, as for example, by magnetic separation, to free the metal from gangue particles.

It will be observed that by reason of the construction of the drum with axially-disposed inlet and discharge openings a relatively deep body of charge is maintained in the drum and that as a consequence the tubes 34 in the rotation of the drum move down into and through the charge in submerged relation thereto during about one-half of each period of rotation. While so moving in submerged relation to the charge the heating tubes are in a very favorable relation for rapid transmission of heat to the charge. In addition, the tubes stir the charge in passing through and lift portions of the charge into the upper part of the drum whence they are showered down through the maze of tubes and the central portion of the drum upon the main body of charge. This showering and stirring action may be varied in degree by varying the speed of rotation of the drum, and should be so controlled in correlation with the operating temperature and with the nature of the ore and the reduced metal produced in the process as to insure against the formation of accretions of reduced sponge upon the tubes and walls of the kiln to an extent that will prevent continuous operation of the process. With a drum having an inside diameter of 8 feet and an inside length of 10 feet, it is recommended that a speed of rotation of from 10 to 20 R. P. M. be employed when producing sponge iron from an ore-carbon mixture, made up, say, of iron oxide from roasted pyrites and ground to a fineness of around 85% or more minus 150 mesh, and bituminous coal ground to about 30 mesh, in the relative proportions of about 10 parts of ore and 9 parts of coal by weight. The rapid rotation of the drum has the further advantage that overheating of the tubes is minimized. The number, size and spacing of the tubes may be varied over a considerable range. For satisfactory results it is recommended that the ratio of heating surface to kiln volume be not less than 2 square feet of heating surface to each cubic foot of kiln volume.

By taking into account the various controlling factors above mentioned and with suitable regulation of the amount and temperature of the combustion gases led through the heating tubes, I find that it is possible to produce substantially homogeneous heating conditions throughout the charge and thus, without overheating any portion of the charge, to maintain the temperature of the charge within a narrow range most conducive to the production continuously of a metallized product having the desired physical characteristics. For the production of a spongy, loosely adherent, fluffy metal product which is easily dislodged from the surfaces of the kiln, I find that the temperature of the charge should be maintained between about 850 and 950° C., and the closer the upper limit can be approached without producing localized overheating with consequent sintering and adhesion to the surfaces, the better from the standpoint of increased capacity of the kiln and efficiency of reduction. By employing the principles of my invention, I find that it is possible to maintain the temperature of the charge within the range 900–950° C. for long periods of operation.

Without departing from the spirit of this invention the relative positions of reducing chamber and firebox may, if desired, be reversed so that the highest temperature is obtained at the end of the reaction period.

It will be understood that the invention is not limited to the use of any particular heating means. Instead of heating indirectly with combustion gases as shown in Figs. 1, 2 and 3, similar advantageous results may be obtained by substituting electrically heated elements, which may take any suitable form and be so disposed in the ore-treating chamber as to insure uniform heating and stirring of the charge. As an example of the use of electric heating means, attention is directed to Fig. 4, wherein is shown a section of a drum provided with electric heating elements made up of resistances 60 enclosed within carborundum tubes 62. These elements are shown as disposed in annularly-spaced rows about the interior of the drum in a similar manner as the heating tubes 34 of the form of the apparatus shown in Figs. 1, 2 and 3.

These electrically heated elements may also be constructed of any suitable material having the proper physical characteristics, as for example, heat resisting steel or special electric resistance alloy. Furthermore, these heating elements may be inserted perpendicular to the axis of rotation if desired, instead of being supported in header plates. These heating elements may be connected in any desirable combination, as series-multiple, to conform to the characteristics of the available electric circuit. When electric heating means are employed the firebox 20 and smoke box 36 may be omitted or modified. Under certain conditions it may be most feasible to utilize heat from combustion gases in conjunction with electrically heated elements. By such combination the heat from the combustion gases may be utilized to preheat and partially reduce the incoming charge under moderate temperature conditions which commercial heat resisting steel will satisfactorily stand, the final reduction and maximum temperature being subsequently obtained in a later stage by use of the electrically heated elements. Such a combination offers the advantages of cheap fuel to furnish the preliminary heating, accurate temperature control and requisite final degree of heat being obtained by electrical means.

Figs. 5, 6 and 7 show modified forms of heating tubes 34a, 34b and 34c. According to the modification shown in Fig. 5 these tubes are provided with fins 64 extending outwardly from the opposite sides thereof and so positioned with respect to the direction of rotation of the kiln as to tend to plow into and lift the charge materials thus promoting intimacy of contact and stirring.

According to the modification of Fig. 6 the tubes themselves are shown as elongated in cross-section. Tubes of this form may be produced for example by rolling metal plates to the curvature as shown and welding the two convex surfaces together to produce the elongated instead of circular flue.

The heating tubes of the modification of Fig. 7 take the general internal form of those of Fig. 6. However, in this modification a greater area of heating surface is obtained by allowing one end of each of the convex plates to project beyond the point of union with the associated plate. In the constructions of Figs. 6 and 7 the flues are inclined in keeping with the direction of rotation of the kiln so as to promote stirring.

While the above-described forms of apparatus are described by way of example, as satisfactory means for use in carrying out the invention, it is to be understood that the principles of the invention are capable of being applied in apparatus of widely differing form. Therefore, the scope of the invention is not to be deemed as limited other than as indicated in the appended claims. It is also to be understood that various modifications in the procedure described may be employed and that various supplementary features may be used in applying the invention without departing from the spirit thereof. In this connection, I would refer to the following features which may be employed as advantageous adjuncts to but which are not necessary features of the process:

As hereinbefore indicated, in order to increase the capacity of the apparatus employed and the degree of reduction of the ore treated, it is desired to operate at the maximum temperature consistent with freedom from adhesion of the reduced metal upon the surfaces of the kiln and heating elements. I have observed that the loosely adherent sponge may be easily dislodged if it is permitted to remain upon the heating elements and other exposed surfaces of the kiln for only a brief interval. When maximum capacity of the apparatus is aimed at, I propose, therefore, to provide in the charge a means for continually dislodging adherent sponge material from the heating elements and other surfaces of the kiln. This may be readily accomplished by adding to the charge sufficient coarse material to produce mild abrasion against the surfaces of the elements and the side walls of the kiln as well as to give a slight impact effect when the material is lifted and dropped alternately as hereinbefore described. Such coarse material may be easily provided in the form of lumps of ore or reducing agent. However, if fine sponge iron is desired as a final product it is suggested that finely divided ore and a certain amount of coal of sufficient size to give the abrasive effect be provided. The maximum size for these lumps is limited by the spacing of the elements, and can best be determined for a given installation by experiment. In most cases a size of ½ to 1 inch should be approximately correct. Too much coarse material should be avoided as it will decrease the degree of mobility of the charge and render more difficult the passage of the elements through the charge.

In the example hereinbefore described, I have specified the use of bituminous coal as the reducing agent. It will be understood, however, that a wide variety of reducing agents may be employed, among them being blue water gas, natural gas, fuel oils, hydrogen, gas coke, petroleum coke, ordinary coke and the various kinds of coal. When gaseous or liquid reducing agents are employed it may be found more convenient to introduce them directly into the ore-treating chamber in any suitable manner and introduce the ore separately, as for example, through the feeder tube 14.

I claim:

1. An apparatus for heating finely-divided solid material comprising a horizontally-disposed cylindrical drum, header plates for closing the ends of said drum, one of said plates being provided with a centrally-disposed opening through which to feed material to said drum and the other of said plates being provided with a centrally-disposed opening through which to discharge material from said drum, a preheating chamber disposed adjacent said feed opening, means for feeding charge materials through said preheating chamber into said drum, a cooling chamber disposed adjacent said discharge opening, means for feeding materials discharged from said drum through said cooling chamber, a plurality of tubes extending longitudinally of said drum in spaced relation to the side walls thereof and to each other, a combustion chamber disposed adjacent the feed end of said drum, means for directing hot gases developed in said combustion chamber around said preheating chamber and thence through said tubes, and means for rotating said drum so as to bring said tubes periodically beneath the normal charge level in said drum and to promote stirring of and transfer of heat to said material.

2. An apparatus for heating finely-divided solid material comprising a horizontally-disposed cylindrical drum, header plates for closing the ends of said drum, one of said plates being provided with a centrally-disposed opening through which to feed material to said drum and the other of said plates being provided with a centrally-disposed opening through which to discharge material from said drum, a preheating chamber disposed adjacent said feed opening, means for feeding charge materials through said preheating chamber into said drum, a cooling chamber disposed adjacent said discharge opening, means for feeding materials discharged from said drum through said cooling chamber, a plurality of tubes extending longitudinally of said drum in spaced relation to the side walls thereof and to each other, a combustion chamber disposed adjacent the drum, means for directing hot gases developed in said combustion chamber through said tubes and around said preheating chamber, and means for rotating said drum so as to bring said tubes periodically beneath the normal charge level in said drum and to promote stirring of and transfer of heat to said material.

3. The method of heating finely divided solid material, which comprises adding a minor proportion of relatively coarse solid material to said finely divided material, submerging heated surfaces in the mixture and, while supplying heat to said surfaces, stirring the mixture by moving said heated surfaces through the mixture.

4. The method of heating finely divided solid material, which comprises adding a minor proportion of relatively coarse solid material to said finely divided material, submerging heated surfaces in the mixture and, while supplying heat to said surfaces, stirring the mixture by moving said heated surfaces through the mixture and so controlling the rate of stirring of said mixture and the amount and size of the coarse material as to insure against the formation of accretions on said heated surfaces.

HARMON E. KEYES.

Patent No. 2,036,578 Granted April 7, 1936

HARMON E. KEYES

The above entitled patent was extended October 2, 1951, under the provisions of the Act of June 30, 1950, for 6 years and 83 days from the expiration of the original term thereof.

*Commissioner of Patents.*